(No Model.)
J. H. NORTHROP.
SPINDLE AND BEARING.
No. 515,715. Patented Feb. 27, 1894.
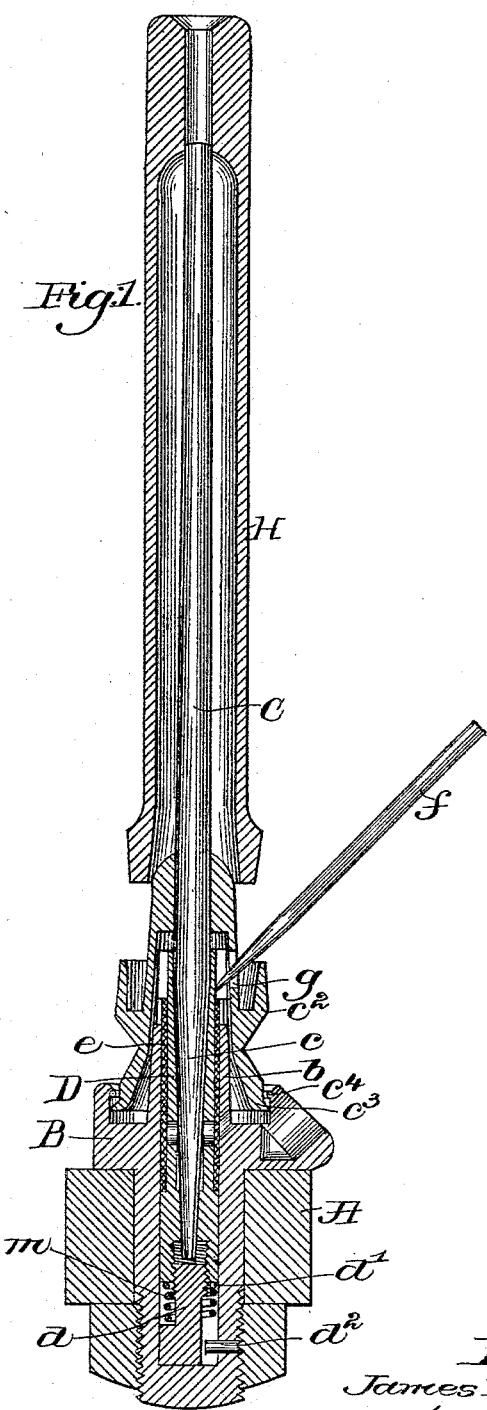
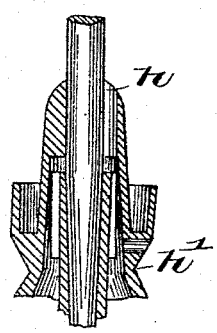
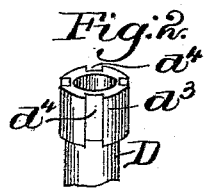
Witnesses,
Louis N. Gowell
Thomas J. Drummond
Inventor
James H. Northrop
by Crosby & Gregory
attys.

UNITED STATES PATENT OFFICE.

JAMES H. NORTHROP, OF HOPEDALE, MASSACHUSETTS.

SPINDLE AND BEARING.

SPECIFICATION forming part of Letters Patent No. 515,715, dated February 27, 1894.

Application filed October 2, 1893. Serial No. 486,962. (No model.)

*To all whom it may concern:*

Be it known that I, JAMES H. NORTHROP, a subject of the Queen of Great Britain, residing at Hopedale, county of Worcester, State of Massachusetts, have invented an Improvement in Spindles and Bearings, of which the following description, in connection with the accompanying drawings, is a specification, like letters on the drawings representing like parts.

This invention has for its object to improve the construction of that class of bearing having a tapered interior to fit the tapered pintle of a sleeve whirl spindle, said bearing being connected to the spindle step in a manner to permit it to be adjusted vertically with relation to the step to maintain the desired and proper fit between the pintle and bearing. In this class of spindle, it being in common use, the bearing is notched in order that it may be engaged by a suitable pin. It may be adjusted by removing the spindle and raising the bearing free from the pin and then turning it so as to engage another notch.

In my invention herein described, means have been provided whereby the lateral bearing, often called the bolster, may be adjusted vertically without removing the spindle therefrom. I have been enabled to effect the desired result by providing the sleeve whirl with a hole or opening suitable to receive a tool by which to engage the bearing and rotate it, the spindle and tool being rotated together, during the time that the bearing is being rotated to adjust it vertically. For greater convenience the lateral bearing has been provided with a head or enlargement above the tubular part of the supporting-case, and said head has been provided externally with a series of notches. I have also combined with the lower end of the bearing a spring of sufficient strength to, by its friction against the lower end of the bearing, prevent the rotation of the bearing but the spring is not so strong but that it will let the bearing turn when engaged by the tool referred to.

Figure 1 in section shows a sleeve whirl spindle and bearing embodying my invention, said figure also showing a bobbin, and a tool by which to turn the bearing; Fig. 2 a detail showing the upper end of the bearing; and Fig. 3 a detail showing a modification of my invention.

The drawings show a rail A upon which is mounted a supporting-case B having an upright tubular extension $b$.

C represents a spindle having a tapered pintle $c$, and a sleeve whirl $c^2$ provided at its lower end with an extension $c^3$ surrounded by a spindle retainer $c^4$, shown as a split ring, adapted to follow the spindle when to be removed from the bearing, said retainer co-operating with a lip or projection substantially as provided for in my Patent No. 505,721, dated September 26, 1893, but instead of the retainer herein shown I may employ any other usual or suitable device.

My supporting-case receives a step $d$, represented as threaded at $d'$, to be engaged by threads at the lower end of the bolster D, represented as surrounded by an elastic packing $e$ which may be used. The step is restrained from rotation by a suitable pin $d^2$, in usual manner. The upper end of the bearing D above the tubular part $b$ is shown as provided with a head $d^3$ suitably notched, as at $d^4$, for the entrance of a suitable tool $f$.

The sleeve whirl, which externally may be of any usual shape, has a tool hole or opening $g$, through which may be passed the tool $f$ so that the tool may enter one of the notches $d^4$, and with the tool in a notch, rotation of the sleeve whirl for a greater or less distance will effect the rotation of the bearing to a corresponding extent on or with relation to the restrained step. The hole or opening $g$ in the whirl will preferably be so located as to be covered by the usual bobbin H when properly seated adhesively on the spindle or whirl, or both in the usual manner. By making the hole $g$ in the side of the whirl, as in Fig. 1, the bobbin when but slightly raised will uncover the said hole, but believing myself to be the first to provide the whirl with a tool hole or opening, this invention is not limited to the particular location of the hole, opening or notch in the whirl; nor to any particular shape of said hole, opening or slot, as it may be differently located without departing from my invention. The hole or opening may be made nearer the upper end of the whirl, as at $h$ in Fig. 3, in the whirl $h'$.

I have combined with the lower end of the lateral bearing D a spring $m$, it acting frictionally against the said bearing, the friction exerted by the spring on said bearing being sufficient to prevent the rotation of the bearing solely by the rotation of the spindle in the bearing, the friction not being so great however but that the bearing may be rotated by the tool $f$.

While it may be preferred by some that the upper end of the lateral bearing have a head, as in Figs. 1 and 2, yet this invention is not limited to such construction, as the upper end of the bearing may terminate within the upper end of the supporting-case in any usual manner, and be suitably notched for the tool.

Having described my invention, what I claim, and desire to secure by Letters Patent, is—

1. A supporting-case, and a lateral bearing therein having a tool receiving portion, combined with a spindle, a sleeve whril thereon having an opening or slot for the passage of a tool to co-operate with the tool receiving portion of the said bearing to effect the rotation of said bearing in the supporting-case, substantially as described.

2. A supporting-case, a lateral bearing loose therein, a spring to act against the said lateral bearing with a degree of friction in excess of that of the spindle within said bearing; a step with which said bearing is connected by a screw thread, and means to restrain the rotation of the step in the supporting-case, to operate, substantially as described.

3. A supporting-case, a lateral bearing therein tapered internally, and a restrained step to which the said bearing is connected by a thread, combined with a sleeve whirl spindle having a tapering pintle, and a yielding friction device coacting with the lower end of the said bearing with a force sufficient to restrain its rotation solely by the friction of the spindle within the bearing, yet not prevent the rotation of the bearing by power applied to it independently of the spinning rotation of the spindle, substantially as described.

In testimony whereof I have signed my name to this specification in the presence of two subscribing witnesses.

JAMES H. NORTHROP.

Witnesses:
HENRY BROWN,
EDWARD T. ROSS.